United States Patent [19]
Trudeau et al.

[11] Patent Number: 6,131,973
[45] Date of Patent: Oct. 17, 2000

[54] VACUUM TRANSFER DEVICE

[75] Inventors: Allen E. Trudeau, Milford; Steven J. Bullied, Cheshire, both of Conn.

[73] Assignee: Sikorsky Aircraft Corporation, Stratford, Conn.

[21] Appl. No.: 09/164,311

[22] Filed: Oct. 1, 1998

[51] Int. Cl.[7] .................................................. B25J 15/06
[52] U.S. Cl. .............................. 294/65; 294/64.1; 901/40
[58] Field of Search .................... 294/64.1, 65; 248/362, 248/363; 269/21, 266; 271/90, 91, 103, 108; 414/627, 737, 752; 901/40

[56] References Cited

U.S. PATENT DOCUMENTS

| | | | |
|---|---|---|---|
| 1,870,694 | 8/1932 | Strickler | 294/64.1 |
| 4,088,312 | 5/1978 | Frosch et al. | 294/65 X |
| 4,763,941 | 8/1988 | Sniderman | 294/64.1 |
| 4,846,517 | 7/1989 | Boke et al. | 294/65 |
| 4,994,240 | 2/1991 | Hayashi | 294/64.1 X |
| 4,995,662 | 2/1991 | Hawkswell | 294/64.1 |
| 5,059,088 | 10/1991 | Klein | 294/64.1 X |
| 5,183,670 | 2/1993 | Trudeau | 294/64.1 X |
| 5,209,804 | 5/1993 | Trudeau | 156/364 |
| 5,290,386 | 3/1994 | Trudeau | 156/364 |
| 5,456,510 | 10/1995 | Coots et al. | 294/64.1 |
| 5,609,377 | 3/1997 | Tanaka | 294/65 |

*Primary Examiner*—Johnny D. Cherry
*Attorney, Agent, or Firm*—Seidel, Gonda, Lavorgna & Monaco, PC

[57] ABSTRACT

A transfer device for picking up and placing resin preimpregnated composite plies. The transfer device includes a movable transfer head with a plurality of transfer feet movably mounted within it. Each transfer foot includes a support cage with a plurality of spaced posts extending between upper and lower ends. A mounting plate is located on the support cage. A pickup foot extends from the lower end of the support cage and has a channel formed through it which communicates with an opening in the lower end of the support cage. The pickup foot includes a tip end adapted to contact the resin preimpregnated composite ply. A valve is mounted within the support cage and includes a valve member located adjacent to the opening in the lower end of the support cage. The valve member is movable between a closed position and an open position. A spring surrounds at least a portion of the periphery of the transfer foot and biases the transfer foot into the transfer head. A pressure source supplies a pressurized medium to the valve for actuating the valve member. A stripper is preferably attached to the valve and actuatable in conjunction with the valve member for dislodging a composite ply from the tip end. An actuation assembly is mounted to the transfer foot and adapted to move the transfer foot with respect to the transfer head in response to a flow of pressurized air.

26 Claims, 4 Drawing Sheets

VACUUM TRANSFER DEVICE

FIELD OF THE INVENTION

The present invention relates to a vacuum transfer device for an automated material handling system. More specifically, the present invention relates to an improved vacuum transfer device with a retractable foot for picking up multiple plies of resin preimpregnated composite material.

BACKGROUND OF THE INVENTION

In recent years, there has been an increase in the use of composite materials for forming structural components. In high tech industries, such as the aerospace and automotive industries, composite materials have become commonplace features in just about all new designs.

Composite materials include a matrix of orientated fibrous material, such as graphite, glass and polyamide (e.g. KEVLAR), impregnated with an epoxy, polymeric, phenolic or other similar organic resinous material. (KEVLAR is a registered trademark of E.I. du Pont De Nemours and Company, Wilmington, Del.) Composite components are made from a series of composite layers or "plies" cut to a predetermined shape.

There are various processes for forming composite structures. One process is a "wet resin" process wherein dry fibers are placed within a mold and wet resin is channeled into the mold. The intermixed material is then cured to form the composite article.

A second type of process is a "prepreg" process wherein fibers are pre-impregnated with resin to form the plies. These plies are then placed in series into a mold to form a laminate, and cured to form the composite article. Typically, the plies are formed by impregnating woven fibrous cloth, yarn, or fiber tow with a predetermined amount of organic resin. The ply is then dried to form a partially cured ("tacky") composite material (commonly referred to as a "prepreg").

Due to the tacky nature of composite prepreg plies, handling of the plies during formation of the composite structure is difficult. One widely used method for laying up prepreg plies in a mold is by individually placing the plies by hand within the mold. The drawbacks with this type of manual lay-up procedure is that it is very labor intensive, resulting in increased manufacturing costs. For example, the prepreg composite material generally must be hand cut along guide lines to the desired shape or pattern, and hand transported to a molding station where the cut prepreg composite ply is placed or stacked in a mold cavity. Hand pressure must be applied to conform the stacked prepreg composite ply to the mold surface contour and to tack the piled prepreg composite plies together. This is a very time consuming process.

Also, since the operator must physically place the plies within the mold, there is always the chance that the plies will not be placed in the correct location. This may require post-manufacturing modifications to the component. At a minimum, it is very difficult to make two parts exactly the same.

In recent years, attempts have been made to automate the placement of the composite prepregs within the mold. These prior art placement systems use electronically controllable suction devices for lifting and placing the prepreg composite plies. However, theses automatic handling devices have had only limited success. Such devices have typically been designed to operate with a particular prepreg ply configuration, thereby limiting the flexibility of such devices to a single operational set-up. In addition, such devices did not accommodate mold configurations which had elaborate contours, such as those typically encountered in aerospace manufacturing applications.

Additionally, prior art material handling apparatus have not proven reliable for automated handling operations involving preimpregnated composite materials. The vacuum forces generated by such prior art devices have generally proven sufficient to pickup and retain preimpregnated composite materials in combination with the material handling apparatus. However, the prior art automated handling systems did not consistently and reliably release the composite prepreg plies upon termination of the vacuum forces.

To alleviate this problem, prior art material handling apparatus were modified to apply a positive pressure force against the preimpregnated composite material to disengage (blow) the composite prepreg from the handling apparatus. It was found, however, that the positive pressure forces used in these prior art devices still was not sufficient to reliably disengage the preimpregnated composite plies. Low magnitude positive pressure devices did not provide sufficient force to disengage the tacky prepreg ply from the handling apparatus. Large magnitude positive pressures, on the other hand, while generally sufficient to disengage preimpregnated composite materials from the material handling apparatus, tended to produce displacement errors when locating the ply in the mold.

Another problem with many of the prior automated handling systems was the inability to transfer more than one composite prepreg ply at a time. The design of the transfer head was such that, once a ply was picked up, the head had to transfer the ply to a mold before returning to pick up another ply. Since a pick-and-place cycle can take upwards of twenty to thirty seconds to complete, the time required to form a composite lay-up using these prior automated devices was relatively long and, consequently, expensive.

One attempt to remedy some of the deficiencies of the prior automated placement devices is disclosed in commonly-owned U.S. Pat. No. 5,183,670, which is incorporated herein by reference in its entirety. This patent discloses an automated placement system that includes a pressurized transfer head with an array of bi-functional transfer feet. Each transfer foot includes a housing with a displaceable knock-off stem. In operation, vacuum pressure is channeled through the housing to assist in retaining a composite prepreg ply to the tip of the foot. When it is desired to place the prepreg ply in a mold, positive pressure is channeled through the housing causing the knock-off stem to force the prepreg ply to disengage from the tip.

U.S. Pat. No. 5,183,670 also discloses controlling the number of feet that are activated depending on the size and shape of the composite prepreg being picked up. The desired number of feet are activated by extending the feet out from the array of feet on the transfer head and applying the vacuum to the extended feet.

Commonly-owned U.S. Pat. Nos. 5,209,804 and 5,290,386 disclose additional automated composite material handling systems which have been recently developed to address some of the problems of the prior art. These patents are also incorporated herein by reference in their entirety.

While the recent developments in automated handling systems have addressed some of the problems associated with handling composite prepreg plies, these recent systems are still do not efficiently control pickup and placement of tacky composite plies.

A need exists for an improved vacuum transfer device for accurately picking and placing composite prepreg plies in a composite manufacturing operation and which device can pickup multiple composite plies in a single cycle.

SUMMARY OF THE INVENTION

The present invention relates to a transfer device for a vacuum transfer system. The transfer device is designed to pick up and place resin preimpregnated composite plies during a composite manufacturing process. The transfer device includes a movable transfer head attached to a robotic arm. The transfer head having a plurality of transfer feet mounted within it, the transfer feet protruding through a plurality of associated holes formed in the face plate of the transfer head. Each transfer foot is mounted so as to be extendable from the transfer head.

Each transfer foot includes a support cage with an upper end, a lower end, and a plurality of spaced vertical posts extending substantially between the upper and lower ends. The spacing between the vertical posts being designed to permit flow of vacuum pressure through the support cage. The lower end of the support cage has an opening formed though it.

A mounting plate is mounted on the support cage.

A pickup foot extends outward from the lower end of the support cage. The pickup foot has a channel formed through it which communicates with the opening formed in the lower end of the support cage. The pickup foot includes a tip end adapted to contact the resin preimpregnated composite ply.

A valve is mounted within the support cage. The valve preferably includes a pressure cylinder mounted to the mounting plate, an actuation arm slidably disposed within the pressure cylinder, and a valve member attached to actuation arm. The valve member is located adjacent to the opening formed in the lower end of the support cage and is movable between a closed position wherein the valve member substantially inhibits flow through the opening, and an open position wherein the valve member permits flow through the opening.

A seal is removably attached to the transfer head and has an aperture formed through it. A portion of the pickup foot extends out through the aperture.

A spring is located about at least a portion of the periphery of the transfer foot. The spring has an upper end in contact with the transfer foot and a lower end in contact with the seal. The spring biases the transfer foot away from the aperture in the seal.

A pressure source supplies a pressurized medium to the pressure cylinder. The supplying of the pressurized medium causes the actuation arm to move the valve member between its open and closed positions.

A stripper is preferably attached to the valve and actuatable in conjunction with the valve member. The stripper is designed to extend out past the tip end of the pickup foot when the valve member is in its closed position for dislodging a composite ply from the tip end.

An actuation assembly is mounted to the transfer foot and adapted to move the transfer foot with respect to the transfer head. In one embodiment, the actuation assembly includes a drive rod and a pressure cylinder. The drive rod has one end slidably disposed within the pressure cylinder and the other end engaged with the mounting plate. The pressure cylinder is supported by the transfer head and is in communication with a pressure source for supplying a pressurized medium. The drive rod moves the mounting plate when the pressure cylinder receives the pressurized medium.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended that the invention cover all alternatives, modifications and equivalents as may be included within its spirit and scope as defined by the appended claims.

Certain terminology is used herein for convenience only and is not be taken as a limitation on the invention. Particularly, words such as "upper," "lower," "left," "right," "horizontal," "vertical," "upward," and "downward" merely describe the configuration shown in the figures. Indeed, the components may be oriented in any direction and the terminology, therefore, should be understood as encompassing such variations unless specified otherwise.

Figure 1:
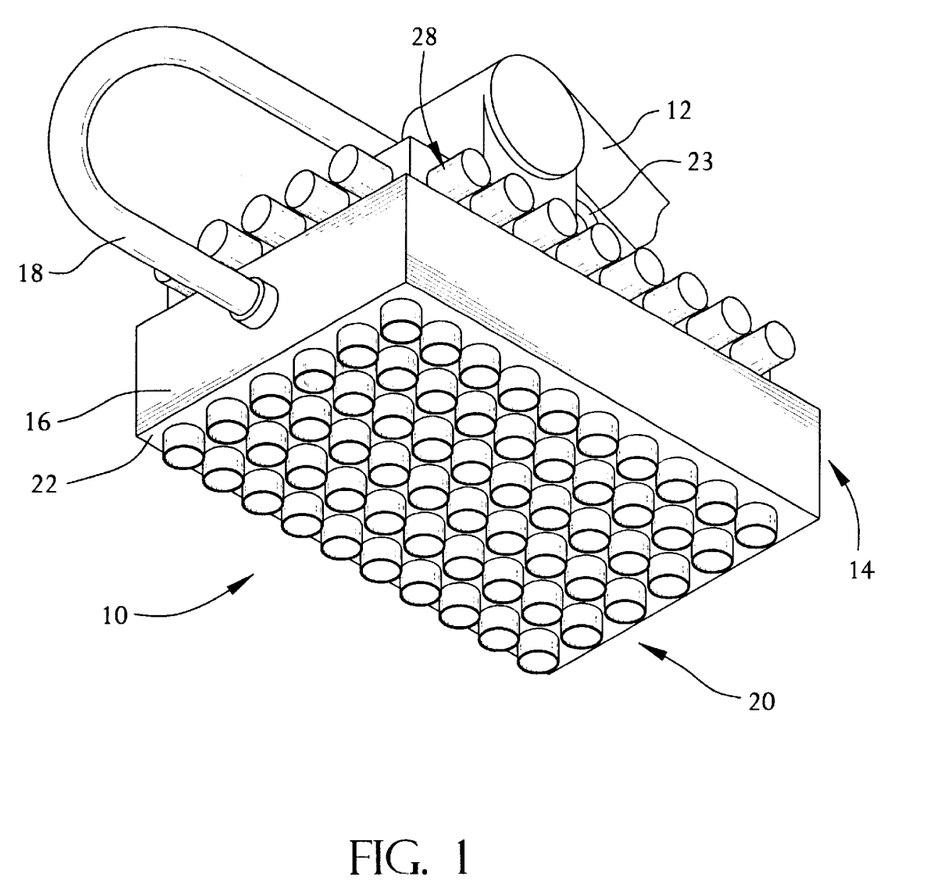
FIG. 1 is an isometric view of a transfer device according to the present invention as it is contemplated for use in an automated material handling system.

Referring now to the drawings, wherein like reference numerals illustrate corresponding or similar elements throughout the several views, FIG. 1 illustrates a pick-and-place transfer device 10 according to one preferred embodiment of the invention. The transfer device 10 is an end effector on a robotic arm 12, which is part of an overall pick-and-place system. The transfer device 10 includes transfer head 14 that is shown attached to the robotic arm 12. The transfer head includes a vacuum plenum 16 which communicates with a negative pressure source (not shown) through a vacuum line 18. The negative pressure source generates a negative pressure (i.e., vacuum) within the plenum 16. The negative pressure source, vacuum line 18 and vacuum plenum 16 are conventional in the art and, therefore, no further discussion is provided herein.

Mounted within the vacuum plenum 16 of the transfer head 14 is an array of transfer feet (generally indicated by the numeral 20). The transfer feet 20 are attached to a lower surface or face plate 22 on the transfer head 14. In one preferred embodiment, there are a total of 39 transfer feet 20 mounted to the transfer head 14 and spaced equidistantly apart from one another. A portion of each transfer foot protrudes outward from the face plate 22 as shown in FIG. 1. The transfer feet 20 will be discussed in more detail below.

A positive pressure source (not shown) is in fluid communication with the transfer head 14. More specifically, a positive pressure source supplies pressurized air through a supply line 23 to a pressure plenum or manifold (not shown), preferably mounted within the transfer head 14. The pressure plenum, in turn, supplies pressurized air to each transfer foot 20 preferably along first and second pressure lines 24, 26 (shown in FIG. 2).

The flow of pressurized air along the first and second pressure lines 24. 26 is controlled by at least one valve (generally identified by the numeral 28). More particularly, a first solenoid valve 28 is operably connected to the first pressure line 24 for controlling flow of pressurized air along the first pressure line 24 and a second solenoid valve 28 is operably connected to the second pressure line 26 for controlling flow of pressurized air along the second pressure line 26. A suitable solenoid valve for use in the present invention is made by SMC Pneumatics, Inc. Indianapolis, Ind.

Figure 2:
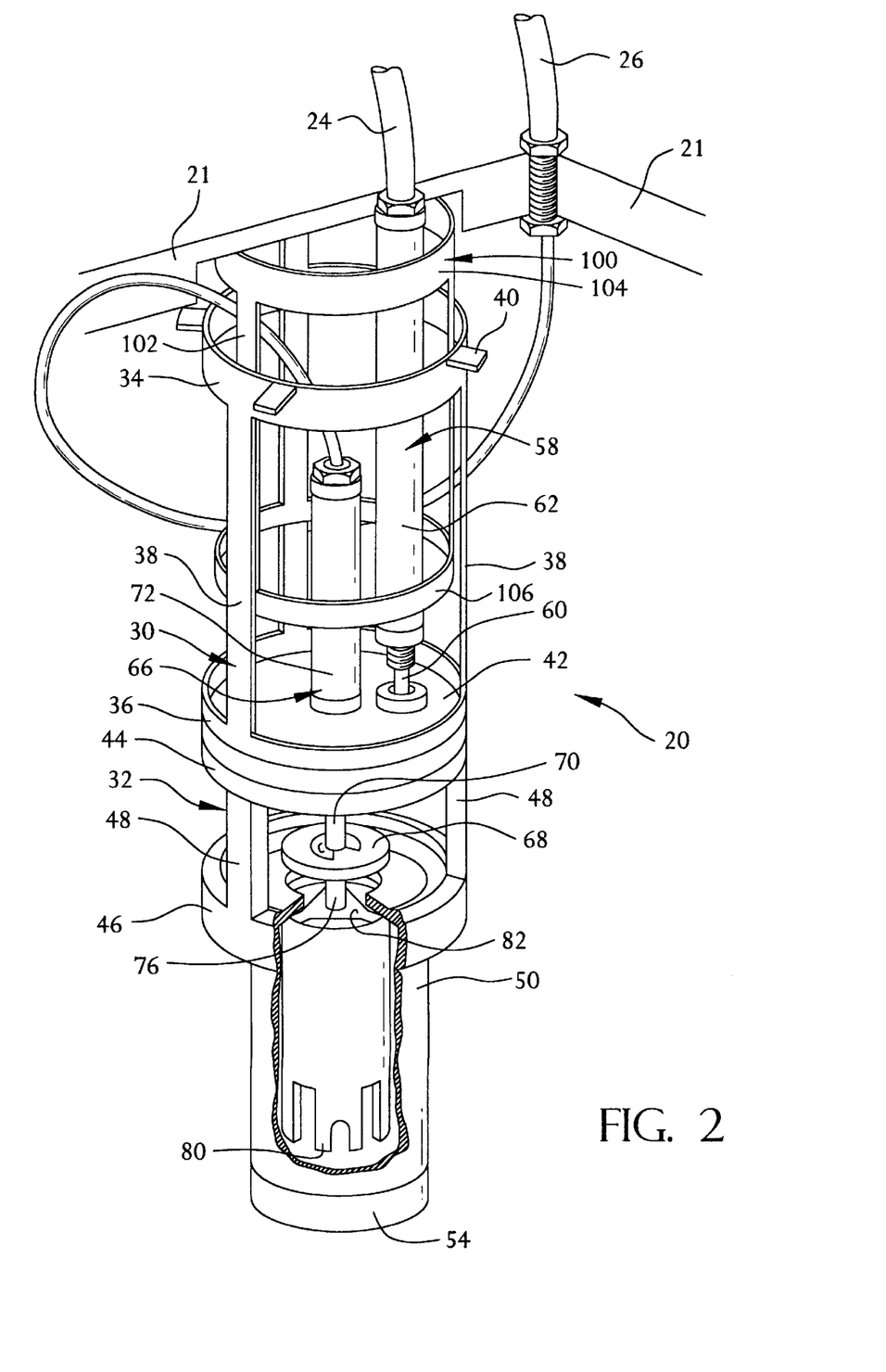
FIG. 2 is an isometric view of one embodiment for a transfer foot according to the present invention.

Referring now to FIG. 2, an enlarged view of one embodiment of the transfer foot 20 is shown. The transfer foot 20 preferably includes an upper support cage 30 and a lower support cage 32. The upper support cage 30 includes upper and lower circumferential rims 34, 36 that are spaced apart from one another. The upper and lower rims 34, 36 are interconnected by a plurality of vertical posts 38 preferably spaced equidistant about the circumference of the upper and lower rims 34, 36 and formed integrally therewith. The spacing between posts 38 will depend on the number of posts used and the diameter of the cage. In the illustrated embodiment, there are three posts that are spaced approximately 1 inch apart. As will be discussed below, this spacing permits negatively pressurized air to flow through the transfer foot 20. The upper support cage 30 preferably has a diameter of approximately 1.25 inches, a wall thickness of approximately 0.030 inches, and is made from stainless steel material, although other dimensions and materials can be substituted therefor.

At least one outwardly projecting flange 40 (shown in FIG. 3A) is formed on the upper rim 34 of the upper support cage 30. The flange 40 can be a separate component attached to the upper cage 30 or, more preferably, is an integral extension of the upper cage 30.

The lower rim 36 is preferably attached to a mounting plate 42 by any conventional means known to those skilled in the art, such as riveting, welding, or bolting. In the Alternatively, the lower rim 36 can be formed integral with the mounting plate 42 as shown in FIGS. 3A–3D. The mounting plate 42 is preferably circular in shape and made from stainless steel.

The lower support cage 32 includes upper and lower circumferential rims 44, 46 that are spaced apart from one another. The upper and lower rims 44, 46 are interconnected by a plurality of vertical posts 48 preferably spaced equidistant about the circumference of the upper and lower rims 44, 46 and formed integrally therewith. As with the upper support cage, the spacing between posts 48 on the lower support cage 32 will depend on the number of posts and the diameter of the cage. In the illustrated embodiment, there are three posts 48 that are spaced approximately 0.75 inches apart. The lower support cage 32 preferably has a diameter of approximately 1.25 inches, a wall thickness of about 0.100 inches, and is made from DELRIN plastic or stainless steel, although other dimensions and materials can be substituted therefor. (DELRIN is a registered trademark of E.I. du Pont De Nemours And Company, Wilmington, Del. for synthetic resinous plastic material.)

The upper rim 44 of the lower support cage 32 is attached to the mounting plate 42 by any conventional means known to those skilled in the art.

Alternatively, the mounting plate 42 can be formed integral with the upper rim 44 of the lower support cage 32 as shown in FIGS. 3A–3D.

A pickup foot 50 is formed on the bottom of the lower support cage 32 and has a channel 52 formed through it. The pickup foot 50 preferably has a hollow cylindrical shape and extends down from the lower rim 46 of the lower support cage 32. In one preferred embodiment, the pickup foot 50 is an integral extension of the lower support cage 32. The pickup foot 50 preferably has a 1.00 inch outer diameter, a 0.100 inch wall thickness and is made from DELRIN plastic. As will be discussed in more detail below, the pickup foot 50 is operative for picking up composite prepreg plies. The pickup foot 50 also provides a conduit within which a stripper 74 translates to assist in dislodging the composite ply from the pickup foot 50.

The pickup foot 50 includes a tip end 54 which contacts the composite ply. Since composite prepreg plies include a very tacky resin, it is desirable to minimize the adherence of the resin on the tip end 54. To accomplish this, in one embodiment of the present invention, the tip end 54 is a separate component from the pickup foot 50. As shown in the figures, the preferred tip end 54 is an annular ring that is attached to the lower edge of the pickup foot 50 by any suitable means known to those skilled in the art, such as press-fitting the tip end 54 onto the lower edge of the pickup foot 50. The tip end 54 is made from a material to which the anticipated resins will not adhere well. In one preferred embodiment, the tip end 54 is made from a self-lubricating plastic that does not absorb moisture, such as DELRIN plastic.

Figure 3A:
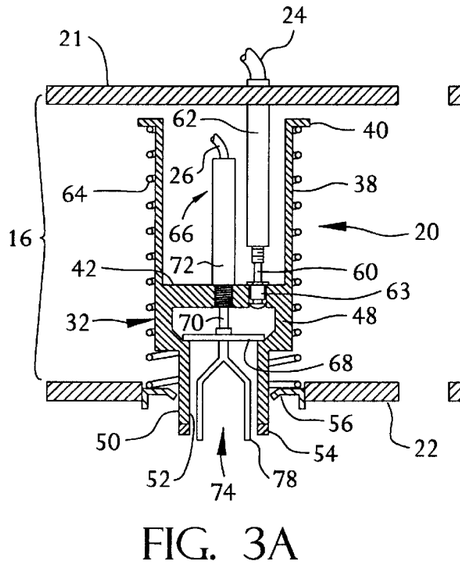
FIGS. 3A–3D illustrate the present invention in use in picking up and releasing a composite material ply.

The transfer foot 20 is removably attached to the lower surface of face plate 22 of the transfer head 14. More particularly, the transfer head 14 has an array of holes formed through the face plate 22. Each transfer foot 20 is positioned within the transfer head 14 such that the tip end 54 of the pickup foot 50 extends out through one of the holes. In one preferred embodiment, the holes have a diameter large enough to permit the entire transfer foot 20 to be inserted into the transfer head 14 from the face plate side. Prior art designs were deficient since they required access to the top and/or interior of the transfer head in order to mount or remove a transfer foot. These prior art mounting configurations made repair and replacement of the transfer foot difficult and time consuming. The present invention eliminates this problem by designing the transfer foot 20 to be mounted to the face plate 22 of the transfer head 14. As shown in FIG. 3A, a seal 56 is used to mount the transfer foot 20 to the face plate 22. The seal 56 is preferably annular in shape and has an inner diameter that is slightly smaller than the outer diameter of the lower support cage 32, the outwardly projecting flanges 40. Hence, when the seal 56 is attached to the transfer head 14, it prevents the transfer foot 20 from sliding out. The seal 56 is attached to the face plate 22 through any conventional means. In the illustrated embodiment, the seal 56 is attached to a face plate 22 with screws. When the transfer foot 20 needs to be replaced, the seal 56 is removed and the transfer foot 20 is slid out of the transfer head 14 as an integral unit.

The pickup foot 50 on the transfer foot 20 is designed to extend out from the transfer head 14 when the transfer foot 20 is activated (i.e., when the transfer foot is selected to pickup a composite ply) and retracted back toward the transfer head 14 either when the transfer foot 20 is deactivated, or after the active transfer foot 20 has picked up a composite prepreg ply. In order to control the extension and retraction of the transfer foot 20, the present invention utilizes an actuation assembly 58. As shown in FIGS. 2 and 3A–3D, the actuation assembly 58, in one embodiment of the invention, includes a drive rod 60 slidably disposed within a pressure cylinder 62. The drive rod 60 is engaged with the transfer foot 20 and the pressure cylinder 62 is mounted to or supported by the transfer head 14. The pressure cylinder 62 is fluidly connected to the pressure source through the first pressure line 24. In the illustrated embodiment, the drive rod 60 is bolted or similarly attached to the mounting plate 42. The pressure cylinder 62 is attached to upper plate 21 by any conventional means. In one preferred embodiment, the pressure cylinder 62 is threaded into the upper plate 21 and the drive rod 60 has an end 63 which engages with a detent in the mounting plate 42. As such, the drive rod in this embodiment is not attached to the mounting plate 42, but simply presses against it. Hence, when the transfer foot 20 is removed from the transfer head 14, the actuation assembly 58 remains within the transfer head 14. A suitable actuation assembly for use in the present invention is sold by Bimba Manufacturing Co., Monee Ill.

Pressurized air is supplied from the pressure source to the pressure cylinder 62 along the first pressure line 24 by opening an associated solenoid valve 28. In one preferred embodiment, 90 psi pressurized air is supplied to the actuation assembly 58 from the pressure source. The pressurized air forces the drive rod 60 to slide out of the pressure cylinder 62 and push down on the mounting plate 42 of the transfer foot 20. The drive rod 60 preferably has a stroke of approximately one inch (i.e., extends the transfer foot 20 approximately one inch). However, depending on the configuration of the transfer head 14 and transfer foot 20, longer or shorter strokes may be used in the present invention. The force of the drive rod 60 on the mounting plate 42 moves the transfer foot 20 within the transfer head 14 resulting in the lower portion of the transfer foot 20 extending out from the transfer head 14. More specifically, the pickup foot 50 extends outward from one of the holes formed in the face plate 22. As shown in the illustrated embodiment, the travel of the transfer foot 20 within the transfer head 14 is limited by contact between the bottom of the lower support cage 32 and the seal 56.

In order to retract the transfer foot 20, the present invention incorporates a biasing force, such as a spring 64, between the transfer foot 20 and the transfer head 14. More particularly, a helical spring 64 circumscribes the entire transfer foot 20 with one end of the spring 64 in contact with the outwardly projecting annular flange 40 on the support cage and the other end of the spring 64 in contact with the seal 56. The outer diameter of the seal 56 is preferably larger than the outer diameter of the spring 64. The spring 20 is configured to bias the transfer foot 20 into the retracted position. Accordingly, the transfer foot 20 can only be extended when a sufficient amount of pressurized air is supplied to the pressure cylinder 62 to overcome the spring force (and any vacuum pressure that may be supplied to the transfer foot 20). When the pressure is discontinued, the potential energy of the spring 64 retracts the transfer foot 20 back into its retracted position. In the preferred embodiment, the spring 64 has a spring force of about three pounds per inch.

It is contemplated that under certain situations, the transfer foot 20 will be exposed to vacuum (negative) pressure when it is being retracted. In these circumstances, the vacuum pressure augments the retraction process by suctioning the transfer foot 20 back into the transfer head 14.

Referring to FIG. 2, the present invention also preferably incorporates a guide 100 for guiding the translation of the transfer foot 20 within the transfer head 14. The guide 100 is mounted to or engaged with the upper plate 21 and has depending arms 102 which contact the upper cage 30. In one embodiment, the guide 100 is a cage with upper and lower rims 104, 106 and three arms 102 extending between the rims. The upper rim 104 is mounted to the upper plate 21. The guide 102 is positioned within the upper cage 30 so as to prevent or limit lateral motion of the upper cage 30. The guide 100 is preferably made from stainless steel material.

In order to pick up a composite ply, the present invention supplies the transfer foot 20 with negative or vacuum pressure when the transfer foot 20 is extended and in contact with (or immediately prior to contact with) a composite ply. As shown in the figures, the transfer feet 20 are mounted within the vacuum plenum 16. As such, the transfer feet 20 are exposed to the vacuum pressure that exists within the plenum 16. A valve assembly 66 mounted to each transfer foot 20 controls the flow of vacuum pressure from vacuum plenum 16 through the pickup foot 50. The transfer foot 20 is designed to facilitate the vacuum flow through the transfer foot 20. Specifically, the open structural configurations of the upper and lower support cages 30, 32 in the illustrated preferred embodiment permit vacuum pressure to completely surround and flow through the transfer foot 20. As such, a higher flow of air through the plenum 16 can be achieved over prior designs. The higher flow rate of air allows for a more efficient vacuum to be created within each transfer foot 20.

Prior automated vacuum systems used a vacuum pump operating at 20 inches of mercury to create a high vacuum pressure. This high vacuum pressure was needed since the design of the transfer feet resulted in a low flow rate through the vacuum plenum. The present invention uses a vacuum pump (not shown) which produces between approximately 4 and 5 inches of mercury, but generates a very high flow rate of approximately 100 cubic feet per minute. Since the transfer feet 20 are designed to minimize obstruction of the flow within the three inch plenum 16, the composite plies experience this high vacuum flow rate. The high flow rate maintains the mesh-like composite plies in tight contact with the transfer feet 20.

As discussed above, the present invention incorporates a valve assembly 66 in the transfer foot 20 for controlling the flow of vacuum pressure through the pickup foot. Referring to FIGS. 3A through 3D, in one embodiment of the invention, the valve assembly 66 is movably mounted to the transfer foot 20. More specifically, the valve assembly 66 is pressure actuated and includes a valve member 68 designed to substantially seal or close off the channel 52 extending through the pickup foot to prevent vacuum flow through it. In one embodiment, the valve member 68 is a disk with a diameter slightly larger than the diameter of the opening of the channel 52.

The valve member 68 is attached to an actuation arm 70 that is slidably disposed within a second pressure cylinder 72. The second pressure cylinder 72 is mounted to the mounting plate 42 and is attached to the pressure source via the second pressure line 26. A solenoid valve (not shown) controls the flow of pressurized air along the second pressure line 26. The valve 66 preferably has a stroke of approximately one inch.

When there is no pressure supplied to the second pressure cylinder 72, the vacuum pressure within the plenum 16 urges the valve member 68 into its retracted, open position wherein vacuum pressure is permitted to flow through the channel 52 in pickup foot 50. When pressurized air is supplied to the second pressure cylinder 72, the actuation arm 70 is forced to extend out of the second pressure cylinder 72 until the valve member 68 seats over the opening to the channel 52 in the pickup foot 50. Once the channel 52 is sealed, vacuum pressure is substantially inhibited from flowing through the pickup foot 50.

As discussed above, composite prepreg plies are impregnated with a tacky resin. The use of the tip cap 54 in the present invention reduces the adherence of the composite ply to the pickup foot 50. However, since the tackiness of composite prepreg plies is not always consistent, the present invention incorporates a stripper 74 into the transfer foot 20. The stripper 74 is mounted to the valve assembly 66, below the valve member 68, and includes a shaft 76 and a stripper end 78. The shaft 76 is preferably attached to or formed integral with the actuation arm 70.

The stripper end 78 includes fingers 80 designed to contact the composite ply to force it to dislodge from the pickup foot 50. In the illustrated embodiment, the stripper end 78 is cylindrical in shape with a plurality of fingers 80 spaced circumferentially around the stripper end 78 on its ply side. The fingers 80 are incorporated into the design to minimize the area that contacts the tacky composite ply, thereby reducing the adherence of the composite ply to the stripper end 78. The stripper 74 is preferably made from DELRIN plastic material, has an outer diameter of approximately ⅝ inches and a wall thickness of about ¹⁄₁₆th inch. There are preferably six fingers 80 formed about the circumference of the stripper end 78, each finger 80 approximately ⅛ inch wide.

The stripper end 78 connects to the shaft 76 so as to permit vacuum pressure to flow freely through the channel 52 (and the stripper end 78). In the embodiment illustrated in FIG. 2, a series of spokes 82 are used to connect the stripper end 78 to the shaft 76.

The outer diameter of the stripper 74 is preferably slightly smaller than the inside diameter of the pickup foot 50. This allows the fingers 80 on the stripper 74 to contact the composite ply close to where the composite ply sticks to the tip end 54 of the pickup foot 50. This provides an efficient stripper 74 design while still permitting the stripper 74 to move freely with respect to the pickup foot 50.

Figure 3B:
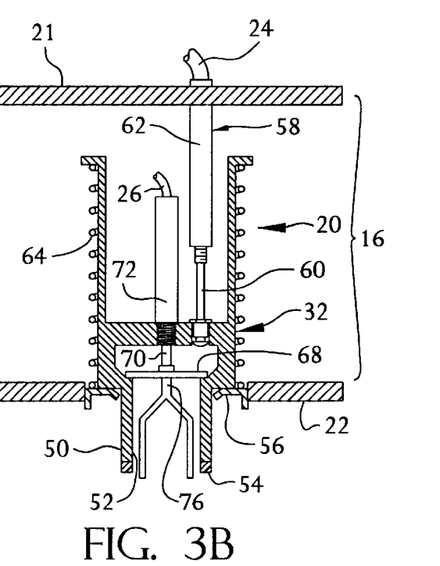
Figure 3C:
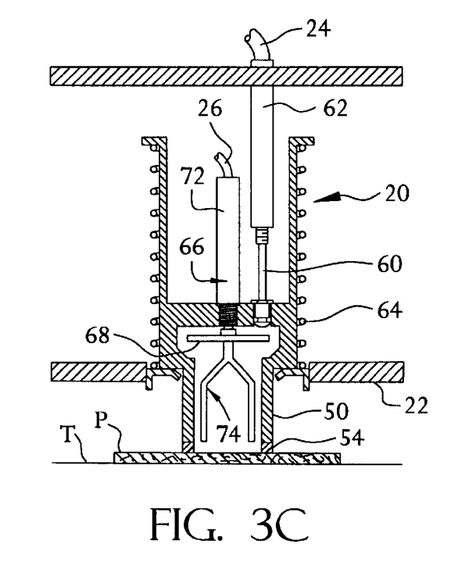
Figure 3D:
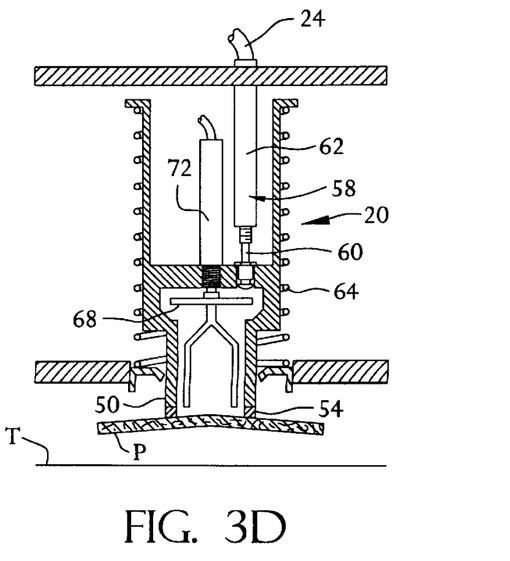
Figure 4:
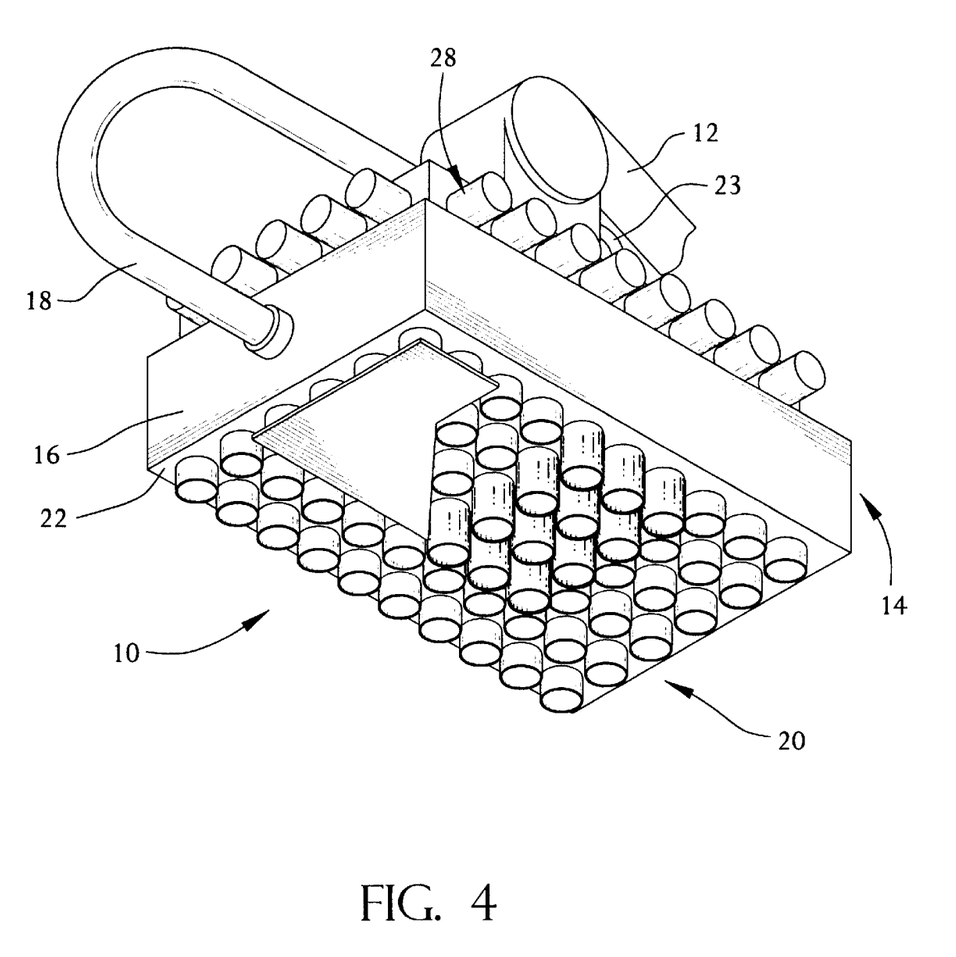
FIG. 4 is am isometric view of a transfer device according to the present invention holding one composite prepreg ply.

As shown in FIG. 3C, when the stripper 74 is in its retracted position, the tips of the fingers 80 are located axially inward from the tip end 54 (i.e., closer to the transfer head 14). This gap between the tip end 54 and the fingers 80 keeps the stripper end 78 from contacting the composite ply when the transfer foot 20 is picking up the ply, and accommodates puckering of the composite ply when it is attached to the pickup foot 50. In one preferred embodiment, the gap is approximately ¼ inch.

The transfer foot 20 and the transfer head 14 operate as follows with reference to FIGS. 3A–3D. For the sake of clarity, the system will be discussed with respect to the operation of only one foot. However, it should be understood that the system may be controlling a plurality of transfer feet at the same time. The transfer head 14 is translated with a robotic arm 12 to a pickup location, such as a ply table or conveyor T, which contains the composite prepreg plies P. At this stage, the array of transfer feet 20 are in their retracted position as shown in FIG. 3A (only one transfer foot is shown) and pressurized air is supplied along the second pressure line 26 so that valve assembly 66 is in its closed (sealed) position. As mentioned above, the present invention contemplates that the transfer head 14 will be used to pickup multiple composite plies during a single cycle. In order to do so, the number of plies, location of each ply, and sequence of ply pickups must be determined. This determination can be preprogrammed for situations where the transfer head 14 is used to continuously pickup the same series of composite plies. In one alternative embodiment, this information is manually inputted into a computer by an operator. In another embodiment, a microprocessor automatically determines which plies to pick up, the locations of the plies and the sequencing. U.S. Pat. No. 5,290,386 discloses various features of an automated ply pickup system which can be used in conjunction with the present invention.

The transfer head 14 is then actuated to orient it into the proper position for picking up the first ply P. The processor activates the appropriate number of transfer feet 20 needed to pickup the first ply P. The activation involves sending a signal to the solenoid valve 28 associated with each foot 20 desired to be activated. Upon actuation of the solenoid valve 28, pressurized air is supplied to the actuation assembly 58. The pressurized air forces the drive rod 60 to translate the transfer foot 20 to its extended position as shown in FIG. 3B. In this position, the valve assembly 66 is still in its closed position preventing vacuum pressure from flowing within through the pickup foot 50. The transfer head 14 is then lowered toward the composite ply P.

Once the transfer head 14 is suitably positioned above the composite ply P, the flow of pressurized air along the second pressure line 26 is stopped and the valve assembly 66 translates to its open position while concomitantly retracting the stripper 74 as shown in FIG. 3C. The tip end 54 of the activated transfer foot 20 is brought into contact with the composite ply P. The transfer foot 20 is then translated into its retracted positions by depressurizing the actuation assembly 58 and allowing the biasing force of the spring 64 to urge the transfer foot 20 into the transfer head 14. The suction force provided by the vacuum pressure flowing through the pickup foot 50 retains the composite ply P on the tip end 54 of the pickup foot 50.

In an alternative embodiment, the transfer head 14 is positioned above the composite ply P and the appropriate transfer feet 20 are actuated into their extended position with the valve assembly 66 in its closed position (stripper 74 extended). The transfer head 14 is lowered so that stripper end 78 contacts the composite ply P. The valve assembly 66 is then opened, pressurizing the pickup foot 50 and retracting the stripper 74 until the tip ends 54 of the pickup foot 50 contact the composite ply. The transfer head 14 is then moved up, and the pickup foot 50 is retracted by depressurizing the actuation assembly 58.

Once the previously activated transfer feet 20 are retracted, the transfer head 14 reorients for the next composite ply P and repeats either of the sequences described above until all the desired composite plies are picked up by the array of transfer feet 20. The robotic arm 12 then moves the transfer head 14 to the ply placement location (e.g., a mold). Once the transfer head 14 is located over the placement location, it orients to the proper position to place one of the plies. The transfer head 14 is then lowered to the proper location. The transfer feet 20 that are associated with the first ply being placed are extended from the transfer head 14 as shown in FIG. 3C. The valve 66 in the transfer foot 20 is then actuated into its closed position causing the stripper 74 to extend out past the tip end of the pickup foot 50 as shown in FIG. 3B. The stripper end 78 contacts the composite ply, forcing it off of the tip end 54 of the pickup foot 50. The elimination of the vacuum pressure in combination with the dislodging force of the stripper 74 removes the composite ply from the pickup foot 50. The transfer foot 20 is then retracted as shown in FIG. 3A and the transfer head 14 is reoriented to place the next composite ply.

The above sequence of steps are carried out for each composite ply until there are no more plies held by the transfer head 14. The transfer head 14 is moved by the robotic arm 12 back to the pickup location to begin the cycle again.

The present invention provides a novel transfer assembly 10 that efficiently and accurately picks and places prepreg composite plies in an automated ply handling system. The use of an array of extendable and retractable transfer feet 20 in the transfer head 14 allows multiple composite prepreg plies to be picked up during a cycle. The transfer feet 20 used in the present invention are designed to efficiently handle composite prepreg plies and to facilitate dislodging of the composite plies.

While the present invention has been described with upper and lower support cages 30, 32, it is also contemplated that the upper support cage 30 can be eliminated. In this alternate embodiment, the lower cage 32 would have an outwardly extending flange 40 formed on or attached to its upper rim. The outwardly extending flange would capture the upper edge of the spring 64, thus allowing a smaller spring to be utilized. As discussed above, the mounting plate 42 can be formed integral with or separately attached to the upper rim 44 of the lower support cage 32.

It should be understood that, while the rims on the support cages 30, 32 are shown as being completely circumferential, they need not be so as long as sufficient support for the vertical posts is provided. If desired, the upper and lower support cages 30, 32 can be formed as a single integral unit.

The present invention is also not limited to the use of pressurized air. On the contrary, any suitable medium can be used for providing the desired pressure.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A transfer foot for a vacuum transfer system, the transfer foot operative for performing pickup and placement of resin preimpregnated composite plies, the transfer foot comprising:
   a support cage having an upper end, a lower end, and a plurality of spaced posts extending substantially between the upper and lower ends, the spacing between the posts permitting flow of vacuum pressure through the support cage, the lower end having an opening formed through it;
   a pickup foot extending outward from a lower end of the support cage, the pickup foot having a channel formed through it which communicates with the opening formed in the lower end of the support cage, the pickup foot having a tip end adapted to contact a resin preimpregnated composite ply; and
   a valve attached to the support cage and having a valve member located adjacent to the opening formed in the lower end of the support cage, the valve member being movable between a closed position wherein the valve member substantially inhibits flow through the opening and an open position wherein the valve member permits flow through the opening.

2. A transfer foot according to claim 1 further comprising a mounting plate located on the upper end of the support cage, and wherein the valve includes a pressure cylinder and an actuation arm, the pressure cylinder being mounted to the mounting plate, the actuation arm having a first end slidably disposed within the pressure cylinder and a second end engaged with the valve member.

3. A transfer foot according to claim 2 wherein the transfer foot is disposed within a movable transfer head, further comprising:
   a seal attached to the transfer head, the seal having an aperture formed through it, a portion of the pickup foot extending out through the aperture;
   a spring disposed about at least a portion of the periphery of the support cage, the spring having an upper end in contact with a flange formed on the support cage and a lower end in contact with the seal, the spring permitting reciprocation of the transfer foot within the transfer head.

4. A transfer foot according to claim 3 further comprising a pressure source for supplying a pressurized medium to the pressure cylinder, the supplying of the pressurized medium adapted to translate the actuation arm and the valve member.

5. A transfer foot according to claim 4 wherein the transfer head includes a plurality of transfer feet, each foot being independently actuatable.

6. A transfer foot according to claim 1 further comprising a stripper attached to the valve and actuatable in conjunction with the valve member, the stripper adapted to extend out past the tip end of the pickup foot when the valve member is in its closed position.

7. A transfer foot according to claim 1 wherein the transfer foot is disposed within a movable transfer head, further comprising an actuation assembly disposed within the transfer head and mounted to the transfer foot, the actuation assembly adapted to translate the transfer foot with respect to the transfer head.

8. A transfer foot according to claim 7 wherein the support cage includes a mounting plate, and wherein the actuation assembly includes a drive rod and a pressure cylinder, the drive rod having one end disposed within the pressure cylinder and the other end engaged with the mounting plate, the pressure cylinder being supported by the transfer head and adapted to receive a pressurized medium, the drive rod adapted to the move the mounting plate when the pressure cylinder receives the pressurized medium.

9. A transfer device for a vacuum transfer system, the transfer device comprising:
   a movable transfer head;
   a plurality of transfer feet disposed within the transfer head, each transfer foot movable with respect to the transfer head, the transfer feet operative for performing pickup and placement of resin preimpregnated composite plies, each transfer foot including
     a support cage having an upper end, a lower end, and a plurality of spaced posts extending substantially between the upper and lower ends, the spacing between the posts permitting flow of vacuum pressure through the support cage, the lower end having an opening formed through it,
     a mounting plate located on the support cage,
     a pickup foot extending outward from the lower end of the support cage, the pickup foot having a channel formed through it which communicates with the opening formed in the lower end of the support cage, the pickup foot having a tip end adapted to contact a resin preimpregnated composite ply, and
     a valve including a pressure cylinder mounted to the mounting plate, an actuation arm slidably disposed within the pressure cylinder, and a valve member attached to the actuation arm, the valve member being located adjacent to the opening formed in the lower end of the support cage, the valve member being movable between a closed position wherein the valve member substantially inhibits flow through the opening and an open position wherein the valve member permits flow through the opening;
   a seal removably attached to the transfer head, the seal having an aperture formed through it, wherein a portion of the pickup foot extends out through the aperture; and
   a spring disposed about at least a portion of the periphery of the transfer foot, the spring having an upper end in contact with the transfer foot and a lower end in contact with the seal, the spring biasing the transfer foot away from the aperture in the seal.

10. A transfer device according to claim 9 further comprising a pressure source for supplying a pressurized medium to the pressure cylinder, the supplying of the pressurized medium causing the actuation arm to move the valve member.

11. A transfer device according to claim 9 further comprising a stripper attached to the valve and actuatable in conjunction with the valve member, the stripper adapted to extend out past the tip end of the pickup foot when the valve member is in its closed position.

12. A transfer device according to claim 9 further comprising an actuation assembly disposed within the transfer head and mounted to the transfer foot, the actuation assembly adapted to move the transfer foot with respect to the transfer head.

13. A transfer device according to claim 12 wherein actuation assembly includes a drive rod and a pressure cylinder, the drive rod having one end disposed within the pressure cylinder and the other end engaged with the mounting plate, the pressure cylinder being supported by the transfer head and in communication with a pressure source for supplying a pressurized medium, the drive rod adapted to the move the mounting plate when the pressure cylinder receives the pressurized medium.

14. A transfer foot for a vacuum transfer system, the transfer foot operative for performing pickup and placement of resin preimpregnated composite plies, the transfer foot comprising:

a support having an upper end, a lower end, and a plurality of apertures formed between the upper and lower ends for permitting a pressurized gas to pass therethrough, the lower end having an opening formed through it;

a pickup foot extending outward from a lower end of the support, the pickup foot having a channel formed through it which communicates with the opening formed in the lower end of the support, the pickup foot having a tip end adapted to contact a resin preimpregnated composite ply; and a valve attached to the support and having a valve member located adjacent to the opening formed in the lower end of the support, the valve member being movable between a closed position wherein the valve member substantially inhibits flow through the opening and an open position wherein the valve member permits flow through the opening.

15. A transfer foot for a vacuum transfer system, the transfer foot operative for performing pickup and placement of resin preimpregnated composite plies, the transfer foot comprising:

a support having a lower end with an opening formed through it;

a pickup foot extending outward from a lower end of the support, the pickup foot having a channel formed through it which communicates with the opening formed in the lower end of the support, the pickup foot having a tip end adapted to contact a resin preimpregnated composite ply;

a valve attached to the support and having an actuatable valve member located adjacent to the opening formed in the lower end of the support, the valve member being movable between a closed position wherein the valve member substantially inhibits flow through the opening and an open position wherein the valve member permits flow through the opening; and a stripper actuatable in combination with the valve member, the stripper operative for facilitating removal of a composite ply from the tip end of the pickup foot.

16. A transfer foot according to claim 15 wherein the stripper is disposed within the pickup foot.

17. A transfer foot according to claim 15 wherein the stripper is engaged with the valve member and wherein actuation of the valve member into its closed position translates the stripper so that a portion of it projects beyond the tip end of the pickup foot.

18. A transfer foot according to claim 15 further comprising a mounting plate located on the support, and wherein the valve includes a pressure cylinder and an actuation arm, the pressure cylinder being mounted to the mounting plate, the actuation arm having a first end slidably disposed within the pressure cylinder and a second end engaged with the valve member.

19. A transfer foot according to claim 18 wherein the transfer foot is disposed within a movable transfer head, further comprising:

a seal attached to the transfer head, the seal having an aperture formed through it, a portion of the pickup foot extending out through the aperture;

a spring disposed about at least a portion of the periphery of the support, the spring having an upper end in contact with a flange formed on the support and a lower end in contact with the seal, the spring permitting reciprocation of the transfer foot within the transfer head.

20. A transfer foot according to claim 19 further comprising a pressure source for supplying a pressurized medium to the pressure cylinder, the supplying of the pressurized medium adapted to translate the actuation arm and the valve member.

21. A transfer foot according to claim 20 wherein the transfer head includes a plurality of transfer feet, each foot being independently actuatable.

22. A transfer foot according to claim 15 wherein the stripper is attached to the valve and adapted to extend out past the tip end of the pickup foot when the valve member is in its closed position.

23. A transfer foot according to claim 15 wherein the transfer foot is disposed within a movable transfer head, further comprising an actuation assembly disposed within the transfer head and mounted to the transfer foot, the actuation assembly adapted to translate the transfer foot with respect to the transfer head.

24. A transfer foot according to claim 23 wherein the support includes a mounting plate, and wherein the actuation assembly includes a drive rod and a pressure cylinder, the drive rod having one end disposed within the pressure cylinder and the other end engaged with the mounting plate, the pressure cylinder being supported by the transfer head and adapted to receive a pressurized medium, the drive rod adapted to the move the mounting plate when the pressure cylinder receives the pressurized medium.

25. A transfer foot according to claim 24 wherein the valve includes a pressure cylinder and an actuation arm, the pressure cylinder being mounted to the mounting plate, the actuation arm having a first end slidably disposed within the pressure cylinder and a second end engaged with the valve member.

26. A transfer foot according to claim 25 further comprising:

a seal attached to the transfer head, the seal having an aperture formed through it, a portion of the pickup foot extending out through the aperture;

a spring disposed about at least a portion of the periphery of the support, the spring having an upper end in contact with a flange formed on the support and a lower end in contact with the seal, the spring permitting reciprocation of the transfer foot within the transfer head.

* * * * *